United States Patent [19]
Schumacher et al.

[11] Patent Number: 5,829,836
[45] Date of Patent: Nov. 3, 1998

[54] SEATING GROUP OF PASSENGER SEATS ESPECIALLY FOR AN AIRCRAFT CABIN

[75] Inventors: Markus Schumacher; Andrew Muin, both of Buxtehude, Germany

[73] Assignee: Daimler Aerospace Airbus GmbH, Hamburg, Germany

[21] Appl. No.: 714,206

[22] Filed: Sep. 16, 1996

[30] Foreign Application Priority Data

Sep. 14, 1995 [DE] Germany ................. 195 34 024.8

[51] Int. Cl.⁶ .......................................... A47C 15/00
[52] U.S. Cl. ................... 297/257; 297/248; 297/335; 297/188.1
[58] Field of Search ....................... 297/232, 411.32, 297/113, 257, 248, 313, 335, 188.1, 188.13, 188.09, 188.08; 244/118.6, 118.5, 122 R

[56] References Cited

U.S. PATENT DOCUMENTS

| | | | |
|---|---|---|---|
| 1,662,378 | 3/1928 | Duke | 297/257 |
| 5,178,345 | 1/1993 | Peltola et al. | 297/232 X |
| 5,284,379 | 2/1994 | Arnold et al. | 297/257 X |
| 5,597,139 | 1/1997 | Beroth | 197/257 X |

FOREIGN PATENT DOCUMENTS

| | | |
|---|---|---|
| 0658477 | 6/1995 | European Pat. Off. . |
| 2280363 | 2/1995 | United Kingdom . |

*Primary Examiner*—Milton Nelson, Jr.
*Attorney, Agent, or Firm*—W. F. Fasse; W. G. Fasse

[57] ABSTRACT

Seating groups for passengers, for example in an aircraft cabin, are equipped with several seats having seat components supported on a support base on which the seat components, especially the seat sections are laterally slideable to make the seats wider when a passenger sits on a seat or narrower when a passenger is not sitting on a seat. The seat widening or narrowing is accomplished in several ways, for example, with the aid of a grooved shaft that operates as a spindle when turned by tilting a seat component, or by springs that vault upwardly when not loaded and spread when a passenger sits on a seat supported by the springs. The grooved shaft can be operated for example by an armrest or a seat section.

6 Claims, 6 Drawing Sheets

SEATING GROUP OF PASSENGER SEATS ESPECIALLY FOR AN AIRCRAFT CABIN

FIELD OF THE INVENTION

The invention relates to a seating group of passenger seats for use particularly in a passenger aircraft, passenger railroad cars, buses, and the like. Each group includes several seats and each seat includes several seat components such as a seat section, a backrest, and armrests.

BACKGROUND INFORMATION

It is known to support seats of a group on a common guide rail on which the seats are laterally displaceable. Conventional passenger seats especially for aircraft have a support base with a seat section that is either rigidly or slidably secured to the support base. A backrest normally rises from the rear edge of the seat section. In an aircraft, the passenger seats preferably form seat rows, whereby two or more seats are arranged next to each other to form a seating group supported by a common support base. The seating groups are generally rigid units constructed for installation in the aircraft cabin, the floor of which is provided with seat mounting rails. Depending on different requirements made by different airlines the seating groups may be arranged in different configurations or layouts. The most common requirement is to maximize the seating capacity relative to the available cabin floor space.

The just mentioned primary requirement of maximizing the seating capacity leads to rather cramped seating conditions for the passengers. Another disadvantage of a passenger cabin with a high number of seats per available floor area is seen in that it results in rather small or narrow cabin aisles between the seating rows, whereby the embarking and disembarking of the passengers takes a substantial length of time. Particular traffic jams are caused when passengers start packing their on-board luggage into the overhead compartments or retrieving luggage while standing in the aisle, thereby blocking the passage of other passengers along the aisle. Conventional aisle widths are too small for two passengers to pass each other conveniently. Another problem with aisles that are too narrow is caused during the supply of food to the passengers and during cleaning of the interior of the aircraft.

The duration of time during which an aircraft is on the ground also referred to as turn around time is significant for the economy of operating a passenger aircraft. Thus, loading and unloading times should be as short as possible and it is necessary to provide, in spite of a high seat density per available floor area in the passenger cabin, an aisle area or traffic area that permits a rapid embarking and disembarking of the passenger. Further, it is necessary to minimize the time needed for aircraft maintenance and cleaning work on the ground. Another requirement that is not necessarily compatible with the just outlined requirements is the need to make the seating groups as comfortable as possible for the passengers. Comfortable seats need more floor space.

According to European Patent Publication EP 0,658,477 A1 (Marechal), published on Jun. 21, 1995, seating units are known in which the individual seats are laterally displaceable on a support base that comprises seat connecting support elements permitting a lateral seat displacement between two end positions. In the known structure it is also possible to displace the entire seating group along a displacement axis and entraining stops are arranged on the support base at predetermined positions to limit the displacement. These stops make sure that the seat interconnecting carrier elements are entrained along a distance predetermined by the stops.

Another conventional seat construction is disclosed in British Patent Publication GB 2,280,363 A (Jackson-Wynch), published on Feb. 1, 1995. The seating units according to Jackson-Wynch comprise two or more seats which are convertible to provide different seat widths by moving seat parts laterally with respect to one another between two configurations also providing two end positions. The seats are defined by end armrests, one of which is fixed in position in the aircraft and intermediate armrests are provided between neighboring seats. Each end armrest and one or both of the intermediate armrests is connected to the neighboring seat by a lost motion device permitting limited relative lateral movement between the armrest and the adjacent seat. A lever permits changing the position of the armrest for changing the spacing between seats arranged on a common guide track.

Both conventional constructions permit a displacement of the seats only by flight attendant personnel and only for all the seats of a group. Thus, it is possible, prior to embarkation, to quickly adjust the seats, for example, between the requirements for a tourist class seating group or a business class seating group. A temporary widening of the cabin aisles for loading and unloading is not intended nor suggested. Thus, the known seats are not improving or rather enlarging the traffic area in the aircraft to permit a rapid embarking and disembarking by the passengers, because at the time the passengers enter the aircraft, the seats are already in their fixed position. Only after passengers have left the aircraft is it possible to prepare for a different seating width for the next flight.

OBJECTS OF THE INVENTION

In view of the above it is the aim of the invention to achieve the following objects singly or in combination:

to enable passengers to narrow their seat for stowing their onboard luggage to thereby effectively increase the aisle space while loading and unloading and to widen the seats for a comfortable sitting during flight;

to efficiently and temporarily increase the available aisle space by narrowing a seating group in its axial length crosswise to the aisle length and to increase the seat width when embarkation has been completed;

to reduce the aircraft time on the ground substantially while providing a more comfortable embarkation and long duration seating for the passengers as well as a more comfortable disembarkation;

generally to permit the passengers to widen the aisle when needed while narrowing the seats and vice versa;

to facilitate the cleaning operations performed on the ground; and to increase the passenger comfort while embarking, while sitting in their seats, and while disembarking.

SUMMARY OF THE INVENTION

One embodiment of a seating group according to the invention is characterized in that a lateral shifting mechanism such as a coupling mechanism is provided for cooperation with at least one seat component of a seating group and the coupling mechanism is operable by a relative motion of any one of the seat components for laterally shifting a seat component. A seat section on which a passenger sits is connected to a guide element which in turn slides along a guide rail forming part of a support base for the seating group. By operating the coupling mechanism the seat section with its guide element is slideable in one or the other direction along the guide rail of the seating group. Depending on the number of coupling mechanisms used, one or two or all seats of a seating group may be moved relative to each other closer together or further apart.

Another embodiment of the invention is characterized in that at least one seat section of a seating group is equipped with a spring frame, preferably leaf spring frame, which is connected through at least one guide element to one or more guide rails of the support base. Normally, when nobody sits on the seat proper, the spring bias of the spring frame is such that the seat section narrows itself automatically. Only when a person sits down on the seat section will it widen itself automatically in response to the passenger's weight. This construction has the added advantage, that the aisle is wide as long as passengers have not taken up their seats.

Yet another advantage of both embodiments is seen in that seats that are not used can remain smaller or narrower so that space is increased for the traffic areas along the aisle and passengers sitting next to an empty or "shrunk" seat can be more comfortable.

The embarking and disembarking of passengers is now more efficiently possible. Further, cleaning the cabin is facilitated and any other work needed to be done on the ground can be performed more easily and more rapidly due to wider aisles when seats are not occupied. As a result, the economy of a commercial airliner has been substantially improved.

In the embodiment in which the seat motion is accomplished by operating an armrest that activates the coupling device, a substantial mechanical advantage enables the passenger to displace the respective seat in the cross direction perpendicularly to the length of an aisle.

Further floor space is gained, enabling a passenger to stow his onboard luggage in the overhead compartments, by constructing at least the seat section next to the aisle to be tiltable into a substantially upright position. Thus, the passenger can step out of the aisle while still being able to stand upright for stowing luggage. The tilting motion upwardly of the seat proper can be coupled with an axial motion of the same seat, for example by a spindle type tilting shaft having a cam groove or threading which engages a cooperating threading in a longitudinal guide rail. In this connection it is advantageous to couple the motion of the seat proper with the respective armrest. Thus, the armrest is also out of the way and not a hindrance to the temporary use of the floor space made available as just described by tilting the seat and armrest upwardly.

The support base is preferably constructed as a tubular frame structure which simplifies the construction of the support base.

The above mentioned embodiment in which the seat proper comprises springs biased in such a way that they reduce the horizontal flat seat area of the seat section by bulging that area upwardly when nobody sits on it, provides an automatic additional space next to seats that are not occupied. Only when somebody sits on such a seat structure will it assume its normal width.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figures 1, 2:
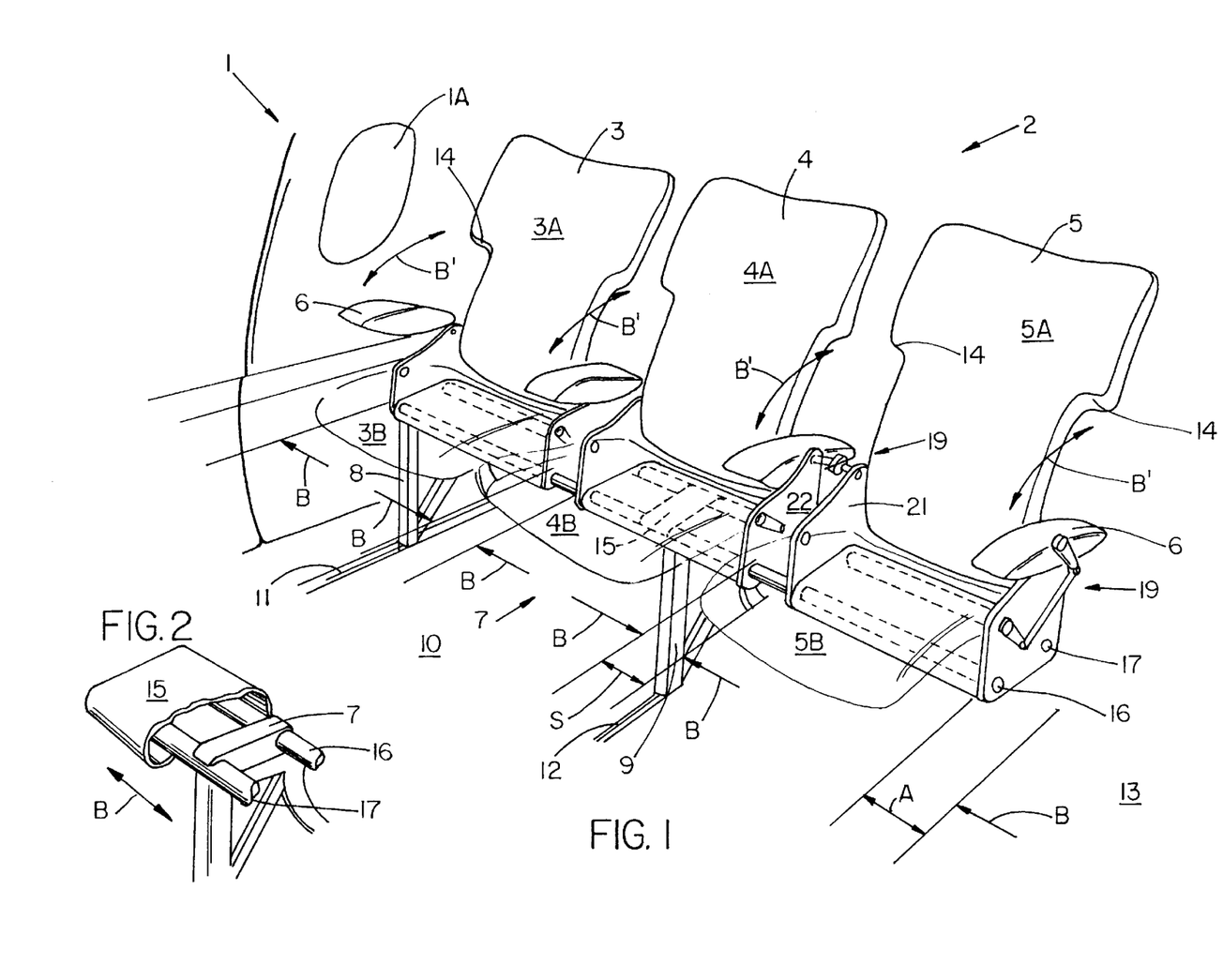
FIG. 1 is a perspective view of a seating group of three seats illustrating a first embodiment of the invention in which the lateral shifting mechanism is a coupling mechanism.
FIG. 2 shows a perspective detail of a guide element connecting each seat proper to at least one guide rail.

FIG. 1 shows an aircraft cabin 1 with a seating group 2 illustrating a first embodiment of the invention. The seating group 2 has a group length in the direction perpendicularly to the length axis of the aircraft and comprises several seats 3, 4, and 5 arranged next to each other in a direction perpendicularly to the length of an aisle 13. Each seat 3, 4, and 5 comprises at least the basic seat components such as a backrest 3A, 4A, 5A and seat sections 3B, 4B and 5B. Preferably, each seat also comprises at least one armrest 6. As shown, the three seats share four armrests. The seats are mounted on a support base 7 which in turn is mounted on base legs 8 and 9 secured with their lower is ends in seat mounting rails 11 and 12 attached in the floor 10 of the cabin 1. The mounting is such, that the seating group can be displaced as a unit along the rails 11 and 12 when the mountings are loosened in accordance with seating layout requirements. Such a mounting is simple. The base leg 8 is fixed in the proper position in the rail 11, preferably close to the cabin wall next to a window 1A. The base leg 9 is fixed in the rail 12 approximately in the mid section of the seating group 2, thereby providing the advantage that the floor space next to the aisle 13 is left free of the components of the support base 7. The exact position of the leg 9 depends on the intended load that must be taken up by the support base 7 which is correspondingly constructed. The spacing between the legs 8 and 9 corresponds to the spacing between the rails 11, 12.

According to the invention it is possible to axially displace the seats 3, 4, and 5 along a guide rail or two guide rails 16 and 17 shown more clearly in FIG. 2. A slider 15 is secured to each seat section 3B, 4B, and 5B, and these sliders 15 are slideable back and forth along the rails 16 and 17 as indicated by the arrows B.

Figure 3:
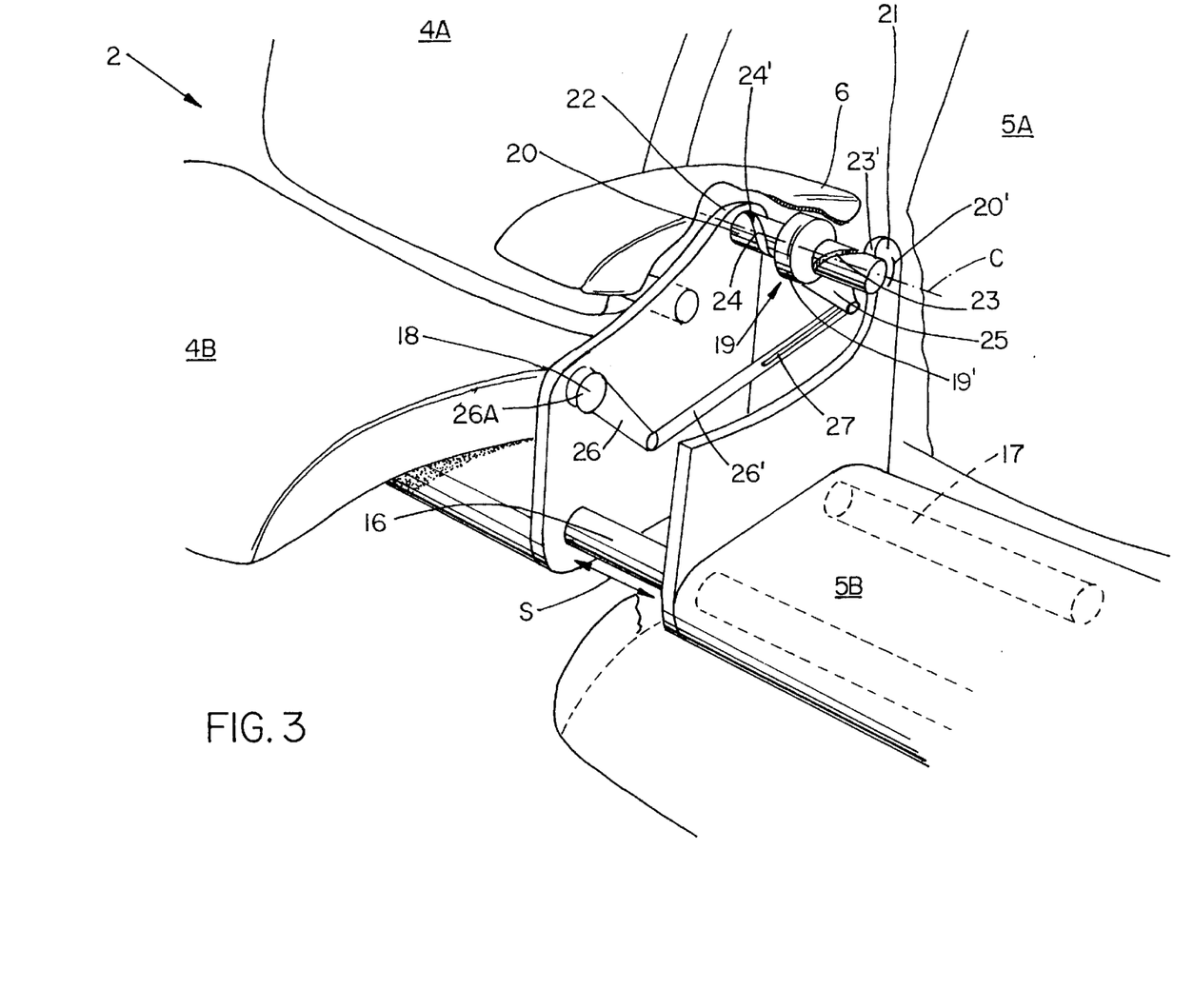
FIG. 3 illustrates on an enlarged scale compared to FIG. 1, a perspective view of the coupling mechanism between two neighboring seats for reducing or increasing the spacing between these seats with the aid of a tilting motion of a seat component, e.g. an armrest.

Referring to FIGS. 1, 2, and 3 in conjunction, a lateral displacement mechanism in the form of a coupling mechanism 19 is connected to and between neighboring seat frame members 21 and 22. With the help of the coupling mechanism 19 it is possible to increase or decrease the spacing S between neighboring seat sections. For this purpose, the coupling mechanism 19 is operable by a seat component, preferably the respective armrest 6. The width of the seat sections 3B, 4B, and 5B in the direction of the guide rails 16 and 17 is normally determined by the width of the seating cushion and the width of the respective armrest or armrests 6. When the armrest 6 in FIG. 3 is in the shown use position, the spacing S between two neighboring seat frame members 21 and 22 is at its largest. However, the total length of the seating group in the direction crosswise to the length of the aisle 13 can be reduced with the help of the coupling mechanism 19 by reducing the spacings S especially when a passenger has not yet taken up the seat or when a seat is not used at all. When the armrest 6 is lifted as indicated by the arrow B' for rotation about an axis C, the spacing S is reduced to the extent that the axial length of the group is reduced approximately by the width of the respective armrest or armrests to thereby widen the aisle 13 at least temporarily by a strip having a width A. Normally, it will be found sufficient to widen the aisle by merely displacing the seat 5B next to the aisle toward the cabin wall. The width A corresponds approximately to the width of one armrest 6. According to the invention it is possible to allocate a coupling mechanism 19 to each of the seats 3, 4, and 5, thereby enabling the lateral or crosswise displacement of any seat independently of a neighboring seat.

The widening of the aisle 13 by the strip A as shown in FIG. 1 substantially facilitates the embarking and disembarking of the passengers because even though a passenger is standing in front of his seat for stowing his carry-on luggage, he will not block the aisle 13. Similarly, the cleaning work and catering work is facilitated by this widened aisle. Further, the seating comfort can be increased by the ability to tilt the armrests upwardly so that if a seat should happen to be unoccupied, the separating armrest 6 can be recessed into a cut-out 14 provided in the backrests 3A, 4A, and 5A, thereby closing the gap formed by these cut-outs 14 and enabling the formation of a closed seating surface having the width of two or three seat cushions and a closed uninterrupted backrest surface. This is particularly convenient when not all seats are fully occupied, so that, for example a child can sleep on two seats while the third seat may still be occupied by an adult.

As mentioned above, and referring to FIG. 2, the lateral displacement of the individual seats 3, 4, and 5 is accomplished by the slide element or slide elements 15 to which the individual seat frame 21, 22 is secured so that the respective seat section can ride along the guide rails 16 and 17, which are preferably telescoping tubular members. The extent of the telescoping is sufficient when it corresponds to the width A when the seats 3, 4, and 5 are pushed toward each other. The slide end element 15 is only shown for the seat 4. However, each seat is equipped in this manner, preferably with a snap-on fit between the elements 15 and the guide rails 16, 17.

FIG. 3 illustrates the details of the coupling mechanism 19 comprising a grooved shaft 20 rotatably mounted with its shaft ends in respective bearing holes in the seat frame members 21 and 22. A coupling ring 19' is rigidly secured on the one hand to the shaft 20 centrally between the shaft ends and on the other hand to the armrest 6. Thus, rotating the armrest 6 clockwise will also rotate the shaft 20 clockwise as indicated by the arrow 20'. Each end of the shaft 20 is provided with a respective groove 23 and 24 forming a cam drive for moving the seat frames 21 and 22 toward each other or away from each other. For this purpose a cam follower pin 23' rigidly secured to the seat frame member 21 engages the groove 23. Similarly, a cam follower pin 24' rigidly secured to the frame member 22 engages the groove 24. Compared to a threading, one groove is left-handed while the other groove is right-handed to make sure that the rotation of the shaft 20 either brings the frame members 21 and 22 toward each other or apart from each other, depending on the direction of rotation of the respective armrest 6. When the operation is accomplished with the armrest 6 it is not necessary to tilt the seat 4B about a hinging axis 18. The engagement between the cam grooves 23, 24, and the respective follower pins 23' and 24' makes sure that the frame members 21 and 22 are properly entrained. The movement of the frame members 21 and 22 toward each other is only limited by the axial width of the coupling ring 19' which leaves enough space for coupling links 26, 26' which in practice are relatively thin in the length direction of the guide rails 16 and 17. When the armrest 6 is tilted counterclockwise into its normal position, the seat frame members 21 and 22 are moved away from each other.

The embodiment shown in FIGS. 1, 2, and 3 also permits the tilting of the seat sections 3B, 4B, and 5B as indicated by the arrows B' by lifting the seat front edge. When the seat sections 3B, 4B and 5B are tilted upwardly, the coupling 13 tranmits the operation onto the respective armrests and lifts them simultaneously. Additionally, a lifting lever 26, 26' is rigidly connected with its forward end 26A to the hinging axis 18, whereby lifting the seat 4B also operates the levers 26, 26', and 25. The other end of the lever 26, 26' is provided with an elongated guide hole 27 engaged by the free end of a crank lever 25 rigidly connected to the coupling ring 19'. The guide slot 27 permits an operation of the coupling mechanism 19 by the armrests 6 as described above independently of the coupling lever 26, 26'. For this purpose the free end of the crank 25 is freely slideable in the guide slot 27. The guide slot 27 is preferably just an elongated hole. If the armrest 6 is tilted upwardly without tilting the seat section 4B, the free end of the crank lever 25 can move clockwise in the slot 27 without affecting the position of the seat section 4B, since, due to the guide slot 27, there is no force transmission from the crank 25 through the lever 26 to the seat 4B, However, when the seat section 4B is tilted clockwise, the free end of the crank 25 will engage the closed rear end in the slot 27 of the lever 26, 26', thereby pulling the crank 25 clockwise and thus also moving the armrest 6 clockwise while simultaneously bringing the seat frames 21 and 22 of the seats 4B and 5B closer together as described above. While the shaft 20 tilts about the axis C, the seat section 4B tilts about the hinging axis 18 in the just described operation. Once the armrest 6 reaches its uppermost almost vertical position, it fills the cut-outs 14 in the backrests 4 and 5 of the respective chairs.

Figure 4:
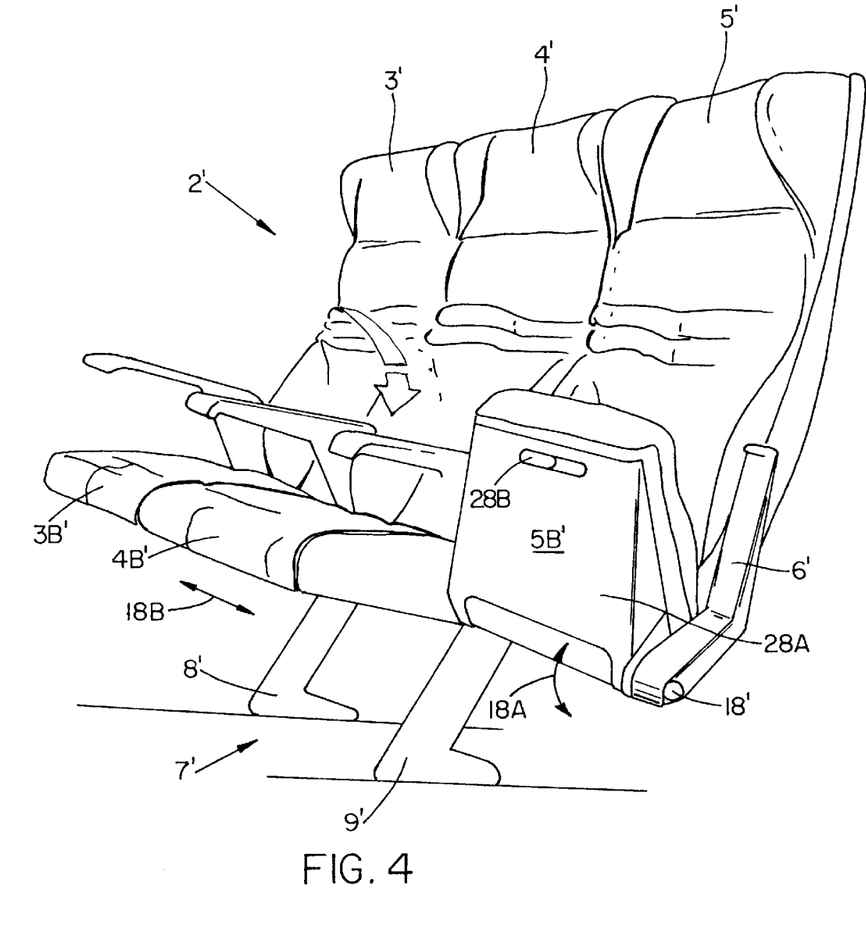
FIG. 4 illustrates another embodiment of the invention with seats that are tiltable upwardly and preferably also slideable sideways in response to an upward or downward tilting motion.

FIG. 4 illustrates an advantageous further embodiment of the invention for increasing the traffic surface area. In FIG. 4 at least one seat section, for example 5B' next to the aisle 13 is hinged to a journal axis 18' of a seating group 2' with backrests 3', 4' and 5'. The tilting motion of the seat 5B' is shown by the arrow 18A. The seating group 2' is mounted on a support base with legs 8' and 9' as described above. By tilting the seat section 5B' upwardly, a passenger can stand on the now free floor area for stowing his carry-on luggage while leaving the aisle free for other passengers to move by. The tilting axis or journal axis 18' is arranged along the rear edge of the seat section 5B' and rigidly secured to the support base 7'. Preferably, the armrest 6' is lifted simultaneously with the seat section 5B' in the manner described above with reference to FIG. 3 through a coupling 19 with grooved shaft 20.

In the embodiment of FIG. 4, the seat sections 3B', 4B', and 5B' are supported on the hinging axis 18', also for a horizontal displacement to push the seats closer to each other as indicated by the arrow 18B. This horizontal movement of the seats may be accomplished with a grooved shaft as described above with reference to FIG. 3, whereby the upward tilting of the seat 5B' simultaneously moves that seat closer to the seat 4B' and so forth.

Figure 5:
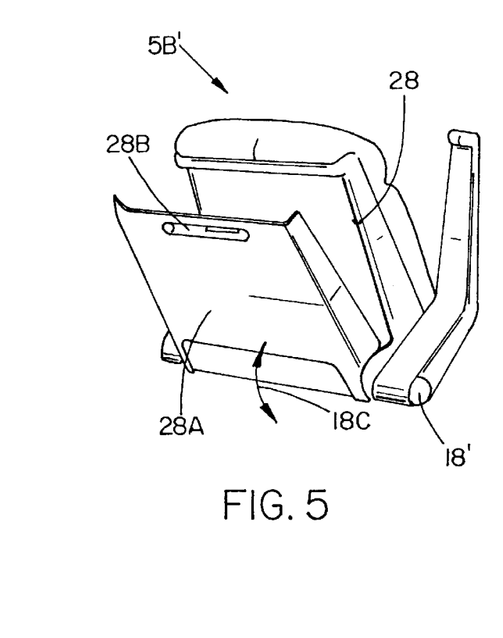
FIG. 5 illustrates an underseat storage compartment, especially suitable for the embodiment of FIG. 4.

FIG. 5 shows a luggage compartment 28 below the seat 5B' closeable by a compartment bottom 28A that is also tiltable about the hinging axis 18', but independently of the seat 5B' as indicated by the arrow 18C. A finger grip 28B in the compartment bottom 28A facilitates the separate tilting of the seat 5B' and the compartment bottom 28A below the seat. When the seat 5B' is tilted upwardly, the compartment 28 is freely accessible provided the compartment bottom 28A is tilted downwardly.

Figures 6, 7, 8:
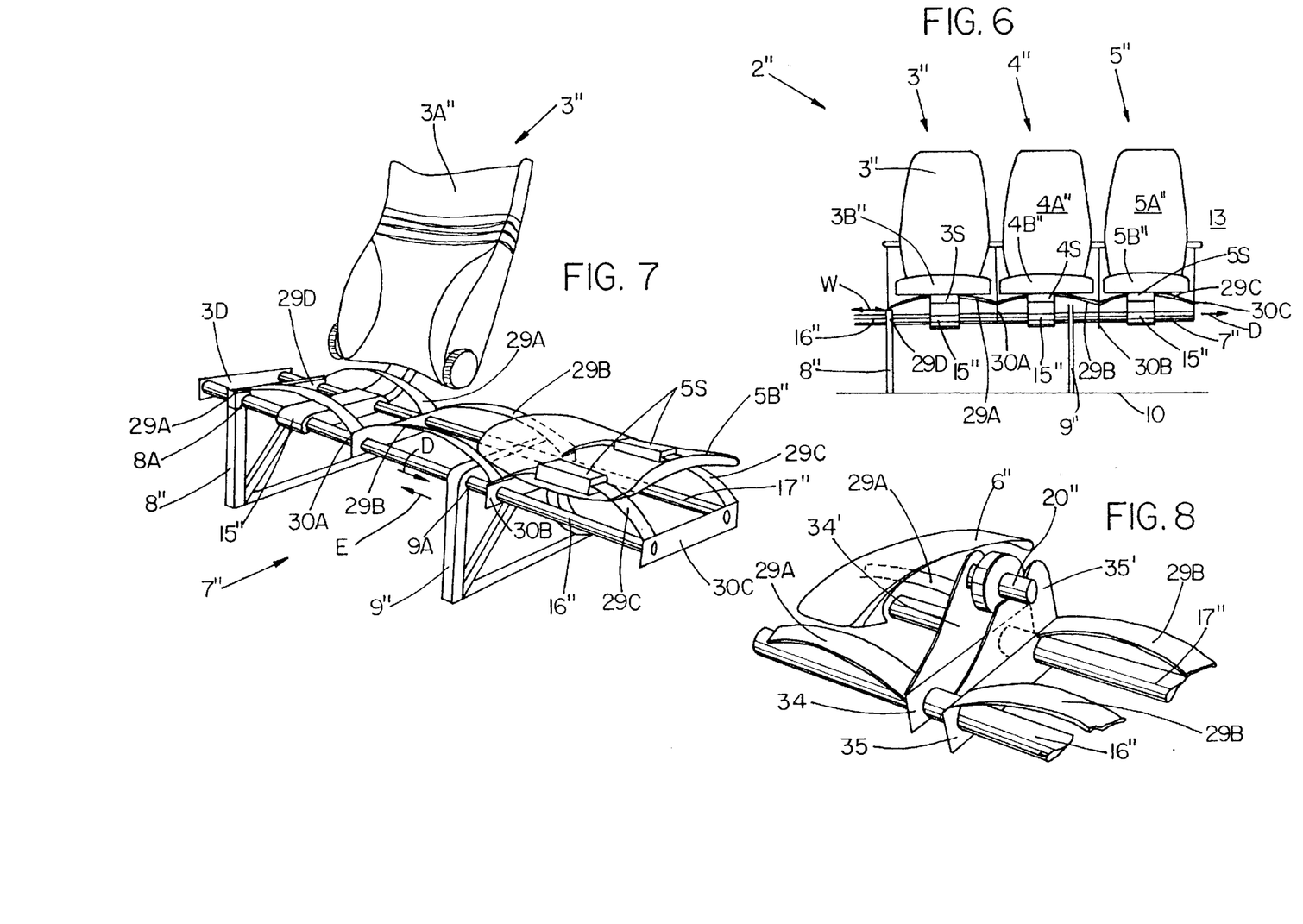
FIG. 6 illustrates another embodiment of the invention in which the individual seats proper are supported by spring frames forming the lateral displacement mechanism which narrows the seat when not occupied and which widens the seat when occupied.
FIG. 7 shows a perspective view of further details of the seating group of FIG. 6.
FIG. 8 shows a coupling mechanism between two lateral displacement mechanisms as shown in FIG. 7.

FIG. 6 shows a third embodiment with a seating group 2", including seats 3", 4", and 5" with seat sections 3B", 4B", and 5B" shown in a raised or rather laterally contracted position when nobody is sitting on these seats. In this condition the seat width in the direction of the arrow D crosswise to the aisle 13 is smaller than the seat width when at least one seat is occupied. A spring frame 29A, 29B, and 29C is provided for each respective seat section which is mounted on the spring frame as seen in FIG. 6. When the seat sections are unoccupied, the guide rails 16", 17" stick out toward the cabin wall by a width W opposite to the direction of the arrow D. However, when the weight of a passenger is applied to any spring frame 29A, 29B, 29C, the springs spread apart, thereby widening the seats. The entire seating group 2" may thus be widened by the width W shown in FIG. 6 because the guide rails 16", 17" now move in the direction of the arrow D. For this purpose, the individual spring frames 29A, 29B, and 29C are secured with their ends to guide crossbars or crosspieces 30A, 30B and 30C as shown in FIG. 7 except that the far ends of the springs 29A are rigidly connected with a crossbar 29D which in turn is rigidly secured to the base leg 8". The right-hand end of the springs 29A are rigidly secured to a crossbar 30A which itself is slideably mounted on the tubular guide rails 16" and 17". The guide rails pass slidingly through holes 8A and 9A in the support base. A right-hand or forward crosspiece 30C rigidly interconnects the two tubular guide rails 16", 17" and the forward ends of the springs 29C are connected to the crosspiece 30C, preferably where the latter is connected to the rails 16", 17". Similarly, at the far end, the two guide bars or rails 16" and 17" are rigidly interconnected by a crosspiece 30D. The two vaulted springs 29B of the intermediate seat 4B" are rigidly connected at their far end to the crosspiece 30A and at their forward end to the crosspiece 30B. These crosspieces 30A and 30B are slidable on the rails 16", 17". Similarly, the springs 29C are connected at their far end to the crosspiece 30B and at their forward end to the crosspiece 30C.

In operation, when a person sits down for example on the seat of the seat section 3B", the springs 29A will reduce their vaulting and become horizontally longer. This motion of the springs 29A will be passed on through the springs 29B and 29C to the guide rails 16" and 17" through the end crosspiece 30C, whereby the rails 16", 17" now move in the direction of the arrow D thereby reducing the width W. Only a portion of the total movement range W is used up if only one person sits on the seat 3". If another person sits on the seat 4", the seating group will move further into the aisle. Similarly, when a third person sits on the seat 5B", the total width W will have been used up by movement of the guide rails 16", 17" in the direction of the arrow D into the aisle 13. When all seats are empty, the guide rails 16" and 17", due to the spring bias, assume automatically their leftmost position as shown in FIG. 6 by moving in the direction of the arrow E shown in FIG. 7.

The backrests 3A", 4A", 5A" are mounted to a respective slide member 15" which is slideable on the guide rails 16", 17" as described above with reference to FIG. 7A.

The seat 5B" next to the aisle 13 is secured to its spring frame 29C by mounting blocks 59 best seen in FIG. 7. The seats 3B" and 4B" are similarly mounted on mounting blocks 3S and 4S respectively, which are secured to the corresponding spring frames 29A and 29B. The embodiment of FIGS. 6 and 7 has the advantage that when no passenger sits on these seats, they move automatically as far to the window wall of the aircraft cabin as possible, thereby automatically widening the aisle 13, whereby W can correspond substantially to the width A shown in FIG. 1.

Figure 7A:
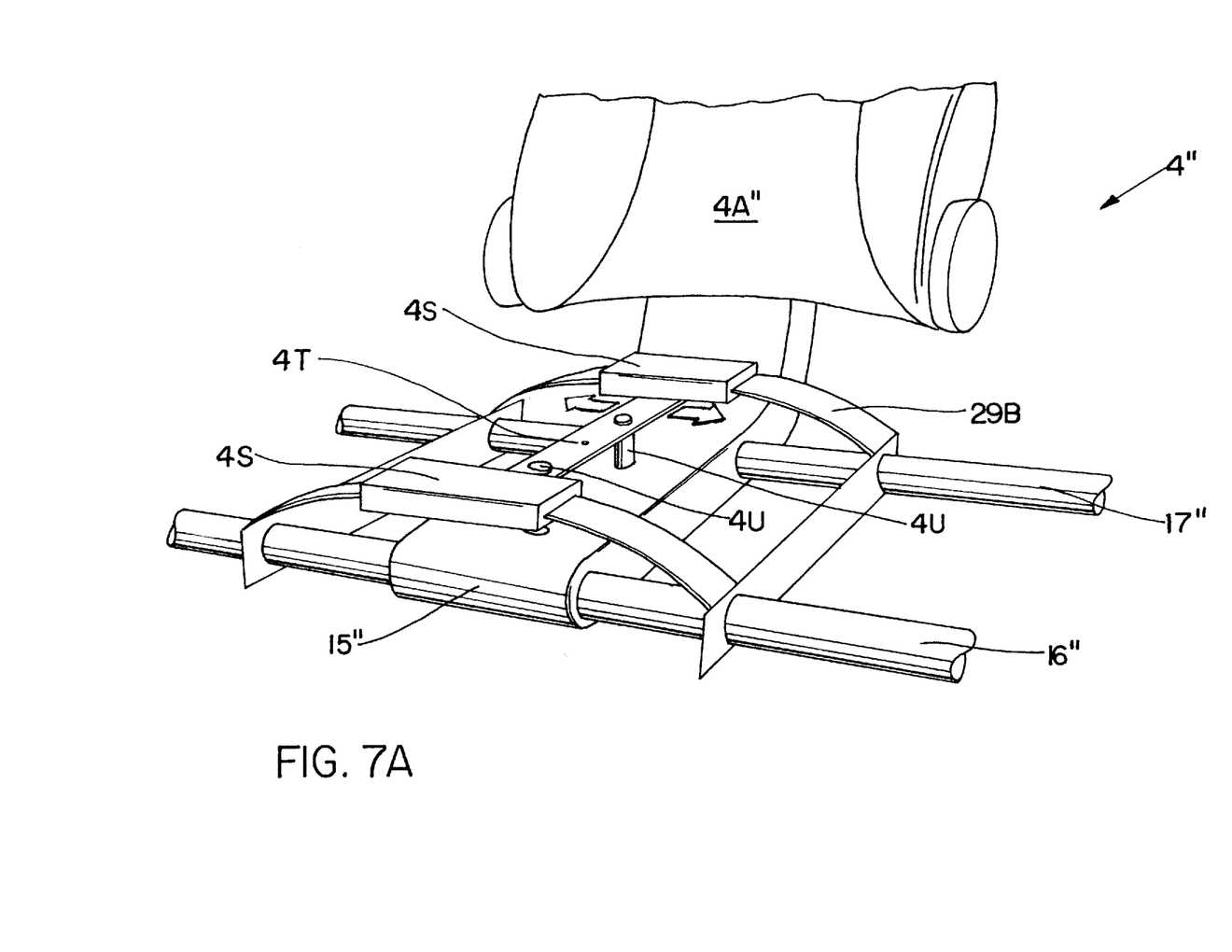
FIG. 7A shows in detail the connection between the slide member 15" and the spring frame 25B.
Figure 9:
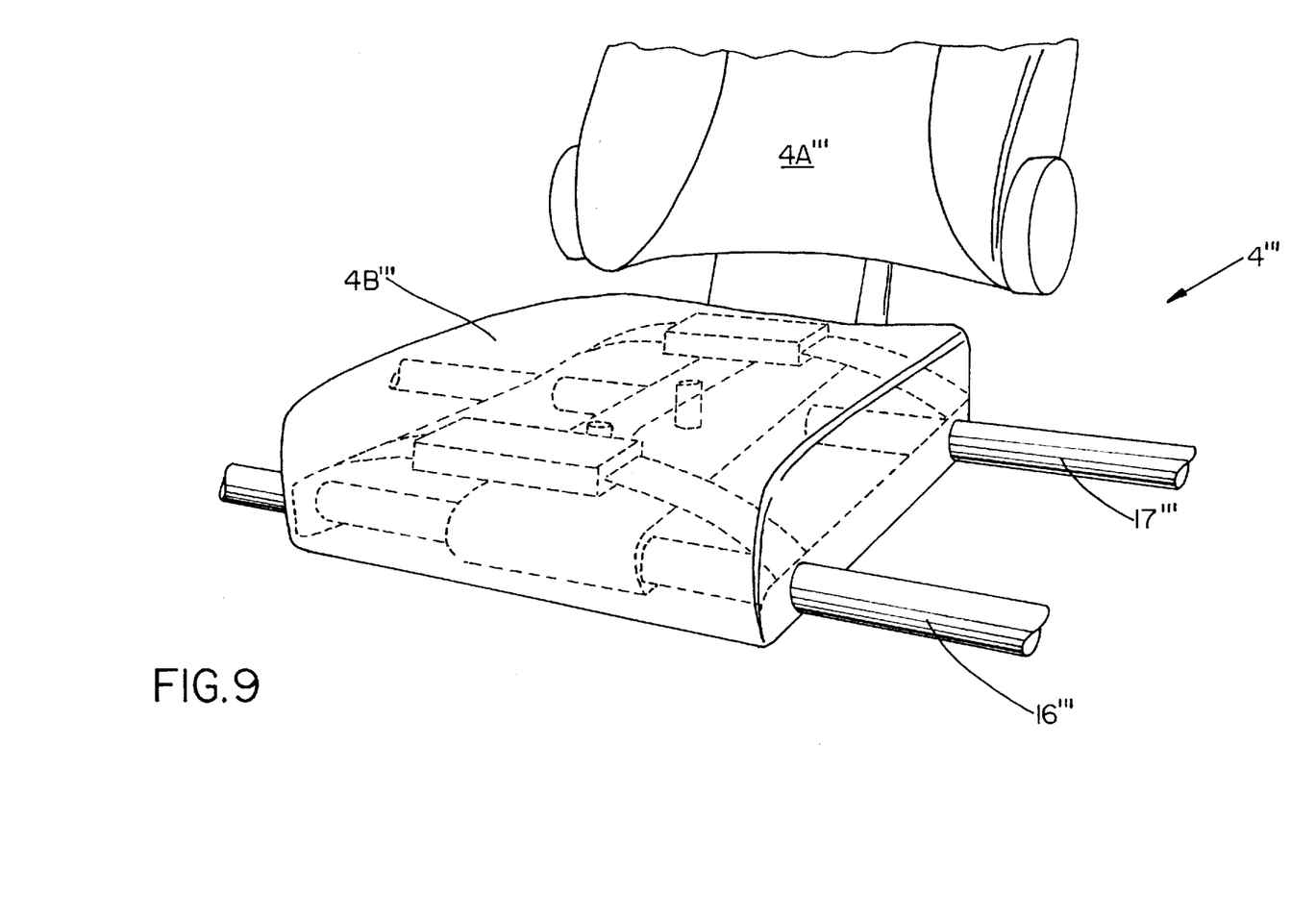
FIG. 9 shows a seat cushion having a spring characteristic.

FIG. 7A shows in detail the connection between the slide member 15" and the spring frame 23B.

A crosspiece 4T between the blocks 4S is provided with two bolts 4U. A the spring leafs 29B extend wider under the weight of a person sitting on the seat 4" the blocks 4S more laterally.

The lateral movement of the blocks 4S is transmitted onto the slide member 15" by means of two bolts 4U which move into two bores in slide member 15.

FIG. 8 shows in a perspective view a modification of the connection of two spring frame sections 29A and 29B. The cross-piece 30A shown in FIG. 7, that connects the springs 29A and the springs 29B with each other and slidingly to the guide rails 16" and 17", has been replaced in FIG. 8 by two separate slidable crosspieces 34 and 35, each having an upward extension 34' and 35'. The cross pieces 34 and 35 are slideable on the guide rails 16" and 17" and the extensions 34' and 35' are interconnected by a grooved shaft 20" that cooperates with the armrest 6" in the manner described above with reference to the grooved shaft 20 shown in FIGS. 1 and 3. Thus, when the armrest 6" is lifted, the two crosspieces 34 and 35 move closer together, to increase the width of the aisle 13.

Although leaf springs 29A, 29B, 29C are preferred for the purposes of the embodiments of FIGS. 6, 7, and 8, other springs having similar characteristics may be used, for example rod springs, or meandering wire springs. Another embodiment consists in a seat cushion 4B''' with spring characteristic as shown in FIG. 3. When no load is applied to the seat cushion 4B''' said seat cushion remains contracted. When a person is seated on said seat cushion 4B''' the seat cushion expands which results in an increased seat width.

Although the invention has been described with reference to specific example embodiments, it will be appreciated that it is intended to cover all modifications and equivalents within the scope of the appended claims.

What is claimed is:

1. A seating group comprising a plurality of passenger seats having together a group length, a support base supporting said passenger seats, each passenger seat comprising a number of seat components including at least a seat section and a backrest, said support base comprising at least one guide rail provided in common for all passenger seats of said seating group, a guide member interposed between said at least one guide rail and a respective one of said seat components, and a lateral shifting mechanism connected to at least one of said seat components for laterally shifting at least one of said seat components along said at least one guide rail in response to a movement of said at least one of said seat components connected to said lateral shifting mechanism so that said group length is temporarily reduced and a respective aisle width is temporarily increased, wherein said lateral shifting mechanism comprises a coupling device (19) operatively connecting neighboring seat sections to each other, and wherein said at least one seat component connected to said shifting mechanism comprises a tiltable armrest (6) rigidly secured to said coupling device so that tilting said armrest in one direction causes said lateral shifting of said at least one of said seat components to temporarily reduce said group length and tilting said armrest in an opposite direction restores said group length.

2. The seating group of claim 1, wherein said backrests have cut-outs (14) into which said armrest fits in its upwardly tilted position.

3. The seating group of claim 1, wherein said at least one guide rail comprises at least one tubular seat support rail section (16, 17).

4. The seating group of claim 1, wherein said support base comprises a hinging axis (18, 18') rigidly secured to said support base, and wherein at least one of said seat sections is hinged to said hinging axis, whereby said at least one seat section is tiltable about said hinging axis.

5. The seating group of claim 1, wherein said coupling device (19) comprises a grooved shaft (20) having a center portion (19') rigidly connected to said armrest (6), a shaft end on each side of said center portion, each shaft end comprising a cam groove (23, 24), said seat sections comprising seat frames (21, 22) each having a bearing for the respective shaft end and a cam follower (23', 24') engaging the respective cam groove (23, 24), whereby a rotation of said armrest (6) rotates said grooved shaft (20) which moves said seat frames (21, 22) along said at least one guide rail.

6. The seating group of claim 5, wherein said support base comprises a hinging axis (18, 18') rigidly secured to said support base, and wherein at least one of said seat sections is hinged to said hinging axis, whereby said at least one seat section is tiltable about said hinging axis, said seating group further comprising a connecting link (25, 26, 27) between said at least one tiltable seat section and said coupling device, said connecting link comprising a crank (25) rigidly secured to said grooved shaft (20), a lever (26, 26') having a first end (26) operatively connected to said tiltable seat section (4B) and a second end with an elongated guide hole (27) wherein a free end of said crank (25) is slideably connected so that said grooved shaft can be turned independently of said tiltable seat section (4B) within limits of said elongated guide hole (27) and with said tiltable seat section when said crank (25) engages an end of said elongated guide hole (27).

* * * * *

UNITED STATES PATENT AND TRADEMARK OFFICE
CERTIFICATE OF CORRECTION

PATENT NO. : 5,829,836
DATED : Nov. 3, 1998
INVENTOR(S) : Schumacher et al.

It is certified that error appears in the above-identified patent and that said Letters Patent is hereby corrected as shown below:

On the Title Page: in [73] Assignee: line 1,
　　　　replace "Daimler Aerospace Airbus GmbH" by
　　　　--Daimler-Benz Aerospace Airbus GmbH--.

Col. 4, line 44, after "lower" delete "is".

Col. 8, line 23, after "frame" replace "23B" by --29B--;
　　　line 26, after "4S", replace "more" by --move--;
　　　line 31, after "member" replace "15." by --15".--;
　　　line 51, after "FIG." replace "3" by --9--.

Signed and Sealed this

Second Day of March, 1999

Attest:

Q. TODD DICKINSON

*Attesting Officer*　　*Acting Commissioner of Patents and Trademarks*